(12) United States Patent
Riley

(10) Patent No.: US 10,244,734 B1
(45) Date of Patent: Apr. 2, 2019

(54) AUTOMATED PET FOOD DISPENSING MACHINE

(71) Applicant: Carlton Riley, Indianapolis, IN (US)

(72) Inventor: Carlton Riley, Indianapolis, IN (US)

( * ) Notice: Subject to any disclaimer, the term of this patent is extended or adjusted under 35 U.S.C. 154(b) by 459 days.

(21) Appl. No.: 15/138,330

(22) Filed: Apr. 26, 2016

(51) Int. Cl.
*A01K 5/02* (2006.01)

(52) U.S. Cl.
CPC .............. *A01K 5/0291* (2013.01); *A01K 5/02* (2013.01)

(58) Field of Classification Search
CPC ............................... A01K 5/02; A01K 5/0291
USPC .............. 119/51.02, 51.11, 56.1, 57.1, 57.92
See application file for complete search history.

(56) References Cited

U.S. PATENT DOCUMENTS

| | | | | |
|---|---|---|---|---|
| 2,534,444 A * | 12/1950 | Hedwall | .............. | A01K 5/0291 119/51.12 |
| 3,720,186 A * | 3/1973 | O'Rourke | ............ | A01K 5/0291 119/51.12 |
| 3,780,702 A * | 12/1973 | Waterbury | ................ | A01K 5/02 119/51.12 |
| 3,782,332 A | 1/1974 | Depenthal | | |
| 4,077,360 A | 3/1978 | Figlia | | |
| 4,249,483 A | 2/1981 | Sobky | | |
| 5,584,263 A * | 12/1996 | Sexton | .................. | A01K 5/0114 119/51.5 |
| 7,219,620 B2 * | 5/2007 | Rucker | ................ | A01K 5/0291 119/51.01 |
| 7,650,855 B2 | 1/2010 | Krishnamurthy | | |
| 8,220,413 B2 * | 7/2012 | Laro | .................... | A01K 5/0291 119/51.11 |
| 8,807,089 B2 * | 8/2014 | Brown | ................. | A01K 1/0107 119/712 |
| 9,232,769 B1 * | 1/2016 | Wolf | ..................... | A01K 5/0291 |
| 2013/0247829 A1 | 9/2013 | Taneja | | |
| 2015/0053138 A1 * | 2/2015 | Ramsey | ............ | H04M 1/72533 119/61.5 |
| 2016/0037748 A1 * | 2/2016 | Taneja | ................. | A01K 5/0291 119/51.11 |

FOREIGN PATENT DOCUMENTS

CN           202340586           7/2012

* cited by examiner

*Primary Examiner* — David J Parsley

(57) ABSTRACT

The automated pet food dispensing machine is an automated device that is adapted for use with cans. The automated pet food dispensing machine is further adapted for use with animals. The automated pet food dispensing machine stores and opens canned food for animals. The automated pet food dispensing machine further dispenses the canned food to make it available for consumption by an animal. The automated pet food dispensing machine comprises a housing, a mechanism, and a scheduler.

9 Claims, 6 Drawing Sheets

US 10,244,734 B1

AUTOMATED PET FOOD DISPENSING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of animal husbandry and the rearing of animals, more specifically, an automatic feeding device for stock or game.

SUMMARY OF INVENTION

The automated pet food dispensing machine is an automated device that is adapted for use with cans. The automated pet food dispensing machine is further adapted for use with animals. The automated pet food dispensing machine stores and opens canned food for animals. The automated pet food dispensing machine further dispenses said canned food to make it available for consumption by an animal.

These together with additional objects, features and advantages of the automated pet food dispensing machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the automated pet food dispensing machine in detail, it is to be understood that the automated pet food dispensing machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated pet food dispensing machine.

It is therefore important that the claims be regarded as including such equivalent construction insofar as they do not depart from the spirit and scope of the automated pet food dispensing machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
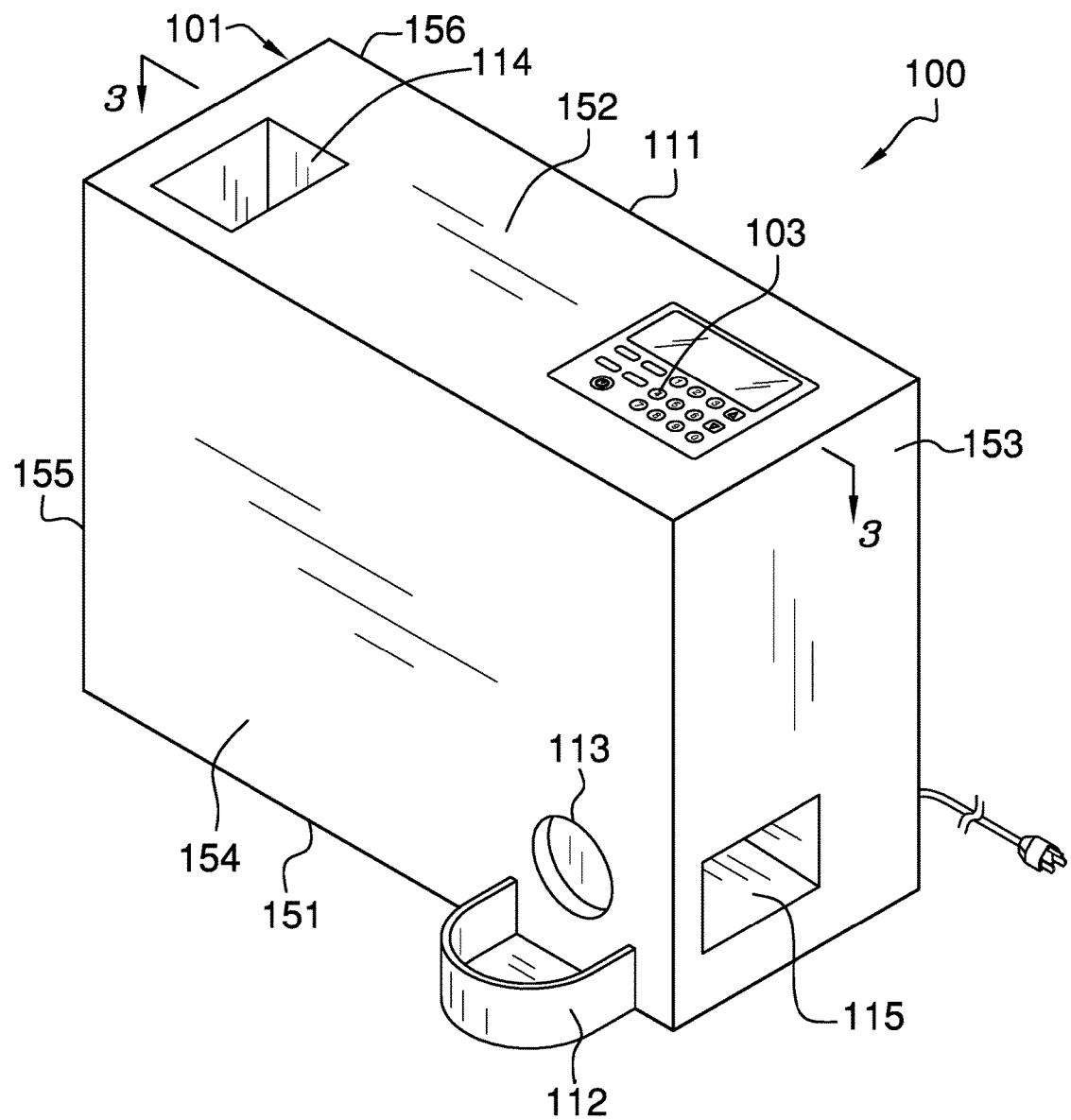
FIG. 1 is a perspective view of an embodiment of the disclosure.
Figure 2:
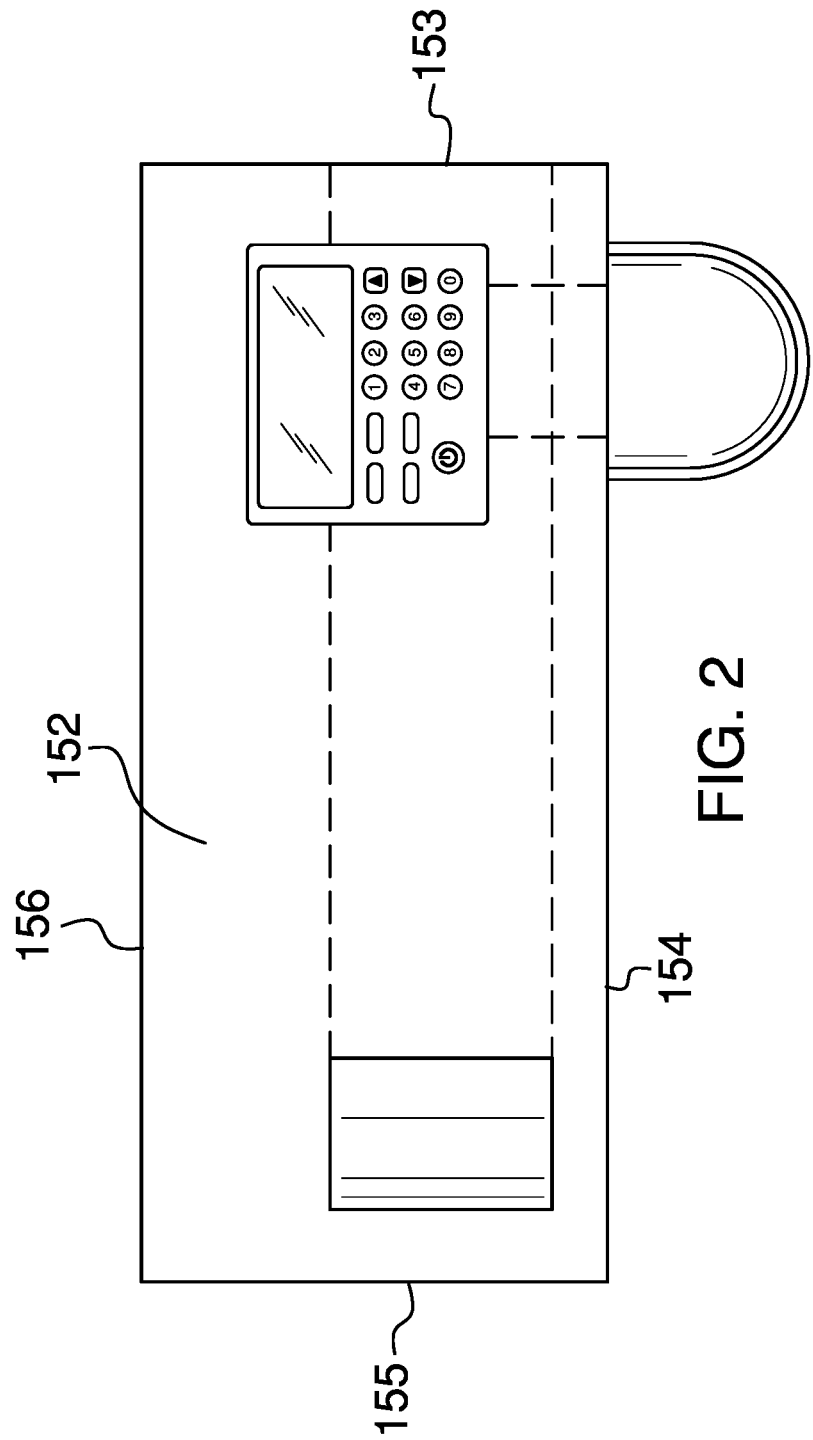
FIG. 2 is a top view of an embodiment of the disclosure.
Figure 3:
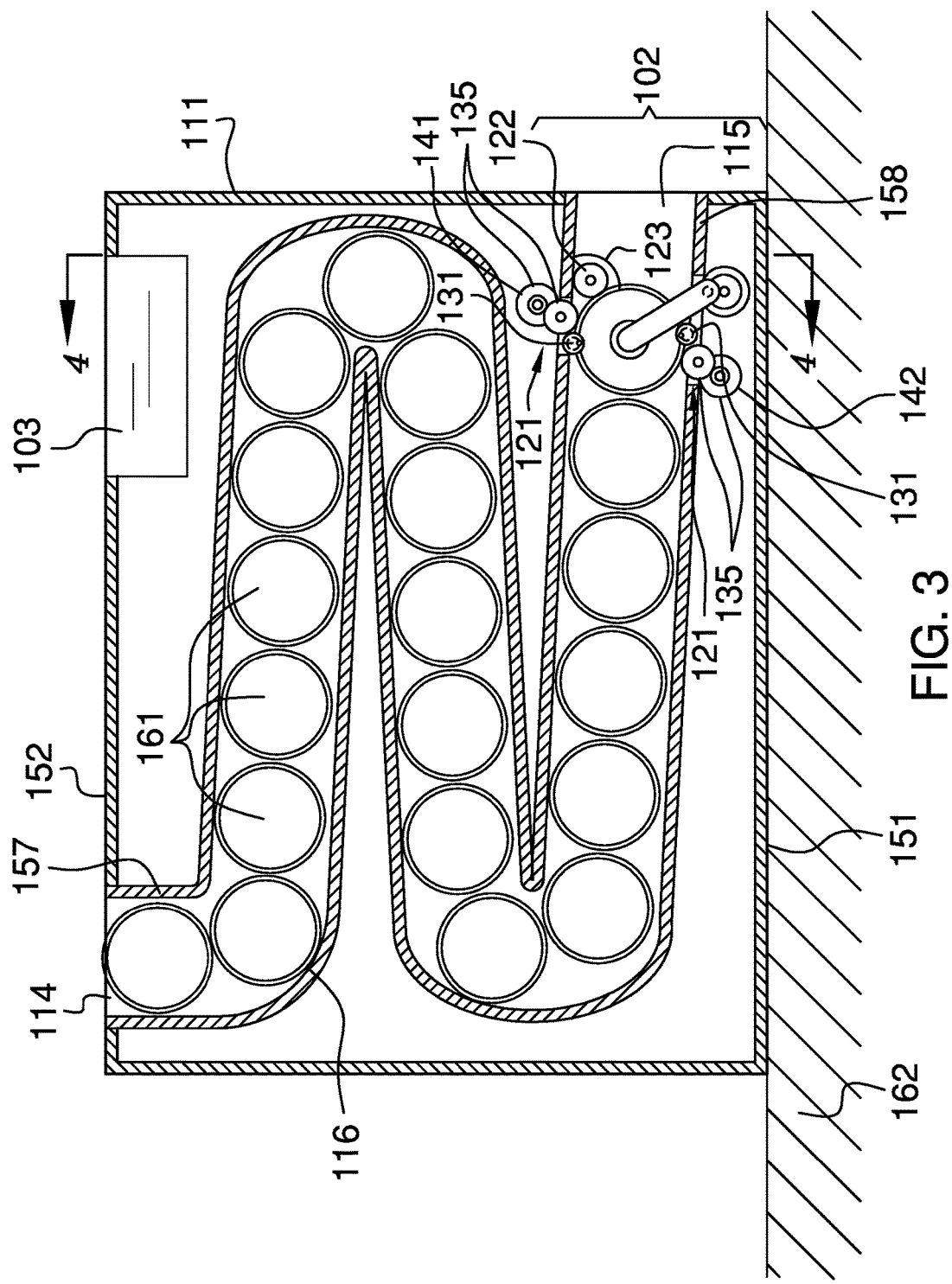
FIG. 3 is a cross-sectional view of an embodiment of the disclosure across 3-3 as shown on FIG. 1.
Figure 4:
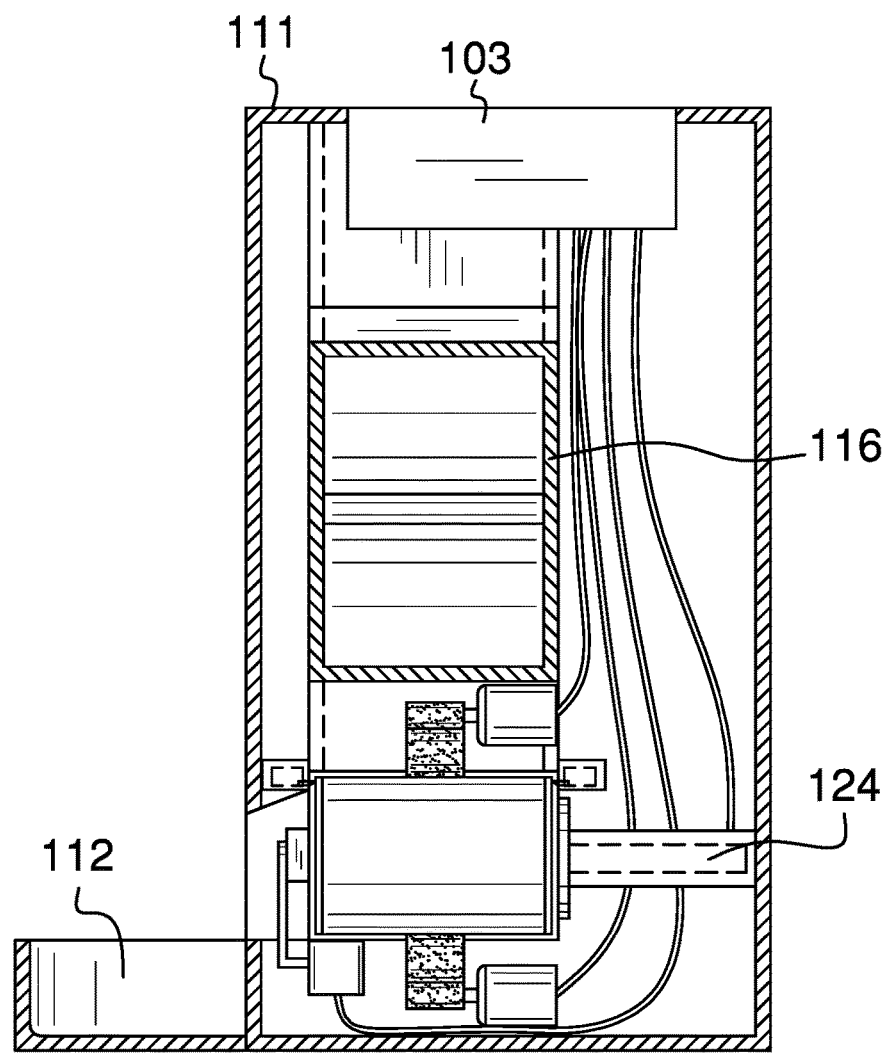
FIG. 4 is a cross-sectional view of an embodiment of the disclosure across 4-4 as shown on FIG. 3.
Figure 5:
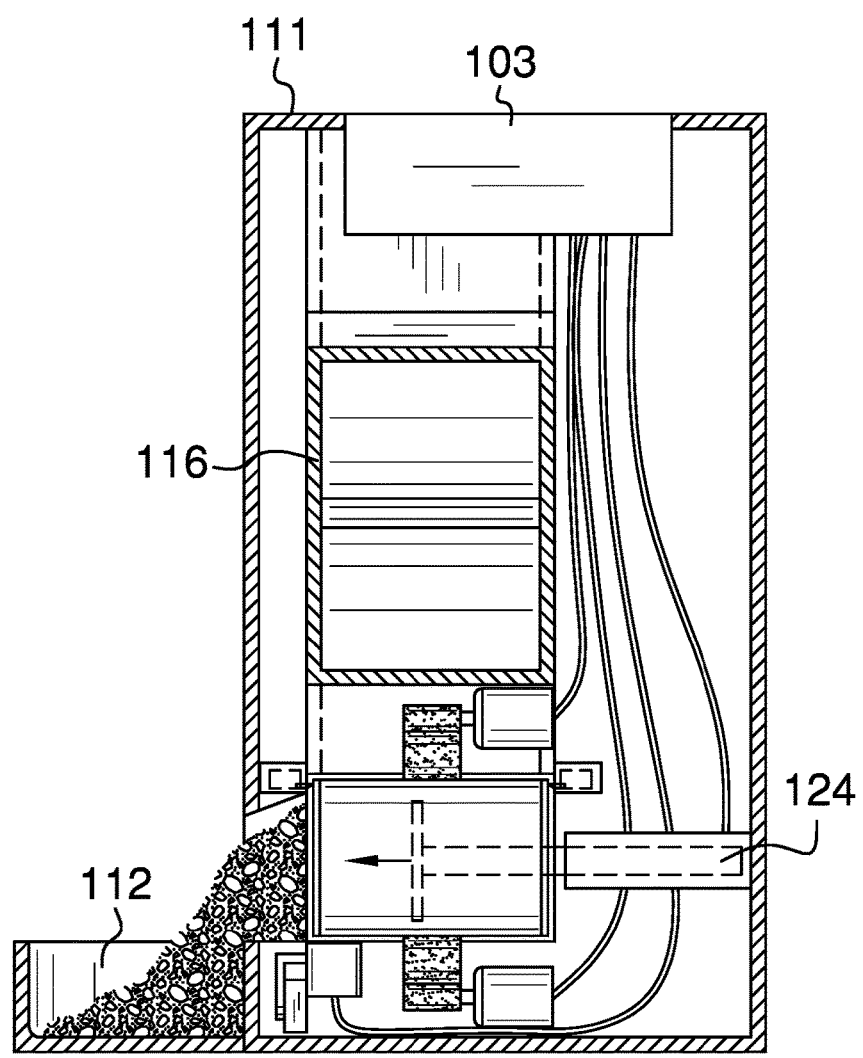
FIG. 5 is a cross-sectional view of an embodiment of the disclosure across 4-4 as shown on FIG. 3.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6.

The automated pet food dispensing machine 100 (hereinafter invention) comprises a housing 101, a mechanism 102, and a scheduler 103. The invention 100 is an automated device that is adapted for use with cans. The invention 100 is further adapted for use with animals. The invention 100 stores and opens canned food 161 for animals. The invention 100 further dispenses said canned food 161 to make it available for consumption by an animal.

The housing 101 is a rigid casing that further comprises a container 111, and a serpentine storage channel 116.

The container 111 is a rigid rectangular hollow box. As shown most clearly in FIG. 1, the container 111 further comprises a bowl 112, a feed port 113, a can port 114, and a discharge port 115. The container 111 is further defined with a first side 151, a second side 152, a third side 153, a fourth side 154, a fifth side 155, and a sixth side 156. The first side 151 is the side that rests on a supporting surface 162 and would traditionally be referred to as the bottom side. The second side 152 is the side of the container 111 that is distal from the first side 151 and would traditionally be referred to as the top side. The discharge port 115 is formed in the third side 153. When the second side 152 is viewed directly, the remaining sides in clockwise order are the third side 153, the fourth side 154, the fifth side 155, and the sixth side 156.

The can port 114 is an aperture formed in the second side 152 that is sized to receive the canned food 161 for storage within the invention 100. The discharge port 115 is an aperture formed in the third side 153 that is sized to allow empty cans to be discharged from invention 100 after the food had been removed from the canned food 161. The feed port 113 is an aperture that is formed in the fourth side 154 of the container 111. As shown most clearly in FIG. 1, food that is discharged from the container 111 through the feed port 113 will fall into the bowl 112. The bowl 112 is a dish or basin that is attached to the container 111 such that the bowl 112 contains food that is discharged through the feed port 113 and stores said food for consumption by animals.

The serpentine storage channel 116 is a gravity driven rack system that is similar to the rack system commonly used in vending machines that sell canned drinks. The serpentine storage channel 116 stores the canned food 161 before usage. The serpentine storage channel 116 is further defined with an intake end 157 and a discharge end 158. Canned food 161 is inserted into the serpentine storage channel 116 at the intake end 157. Canned food 161 is processed and discharged into the bowl 112 at the discharge end 158. As shown most clearly in FIG. 3, the serpentine storage channel 116 is formed in a serpentine pattern that is designed with an incline such that when food is removed from the can of canned food 161 from the can of food and the empty can is removed from the discharge end 158 of the serpentine storage channel 116 then gravity will cause the remaining canned food 161 to roll through the serpentine storage channel 116 into a new position.

The purpose of the mechanism 102 is: 1) open the canned food 161; 2) discharge the contents of the canned food 161 through the feed port 113 into the bowl 112; and 3) discharge the empty can through the discharge port 115. The mechanism 102 comprises a plurality of can openers 121, a first roller 122, a first roller motor 123, and a piston 124. The mechanism 102 is mounted on the serpentine storage channel 116 at the discharge end 158. The first roller 122 is a readily and commercially available urethane covered roller and an associated driveshaft and bearing. The first roller motor 123 is an electric motor that is attached to the driveshaft of the first roller 122. The piston 124 is a commercially available solenoid with a shaft sized to fit through the canned food 161 after the canned food 161 is opened.

The operation of the invention 100 is a follows. The canned food 161 to be opened is held in position by the first roller 122 by physical contact with the first roller 122. The scheduler 103 initiates and controls the operation of the mechanism 102. The scheduler 103 is described elsewhere in this disclosure. Upon initiation, each of the plurality of can openers 121 opens a selected end (herein after lid 163) of the canned food 161 and removes and separates the lid 163 from the balance of the canned food 161. After the lid 163 is separated from the canned food 161 by each of the plurality of can openers 121, the piston 124 pushes through the cylinder of the canned food 161 thereby discharging the contents of the canned food 161 through the feed port 113 and into the bowl 112. The first roller motor 123 is then initiated such that the first roller motor 123 rotates the first roller 122. The rotation of the first roller 122 rotates the empty can of canned food 161 such that the empty can of canned food 161 is discharged from the container 111. Gravity then rolls the cans remaining in the serpentine storage channel 116 into the next position in line.

Figure 6:
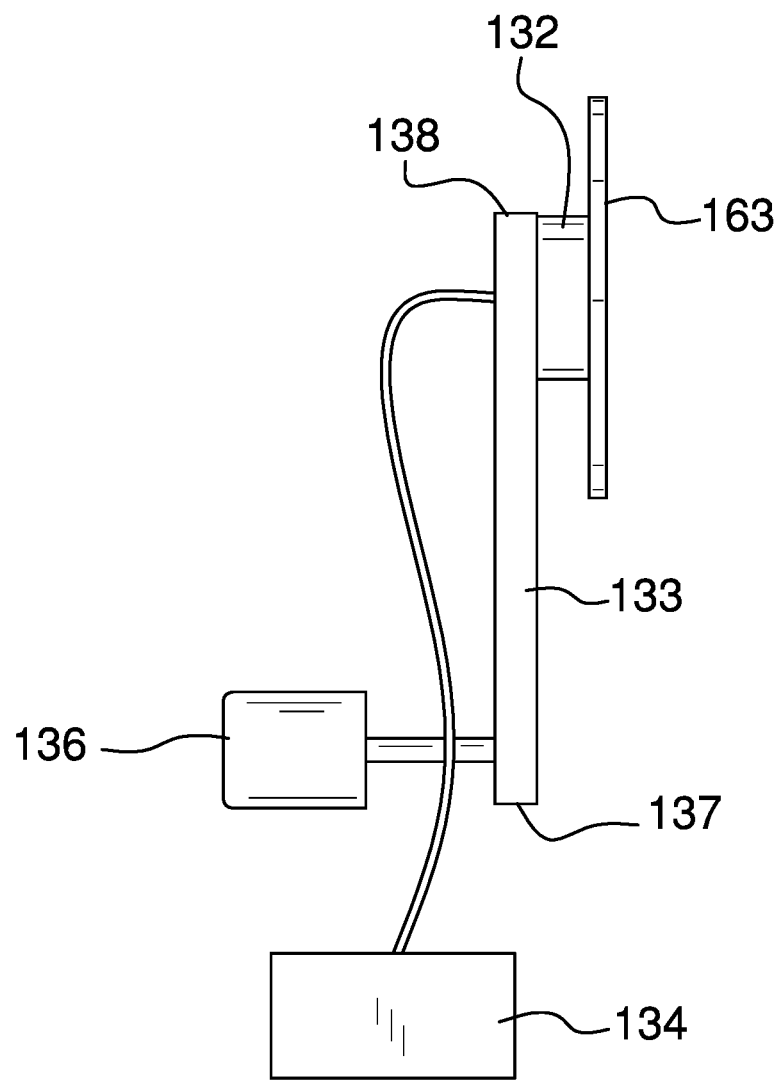
FIG. 6 is a detail view of an embodiment of the disclosure.

Each of the plurality of can openers 121 further comprises a cutting disk 131, a lid magnet 132, a magnet arm 133, a magnet actuator 134, a cutting motor 135, and an arm motor 136. The cutting disk 131 is a blade that is used to remove the lid 163 located at a selected end of the canned food 161. The cutting motor 135 is an electric motor that is used to rotate the cutting disk 131 during the cutting operation. The cutting disk 131 and cutting motor 135 are the same items as would be used in a commercially available can opener. As shown in FIG. 6, the lid magnet 132, the magnet arm 133, the magnet actuator 134 and the arm motor 136 are assembled into a single unit. The magnet arm 133 is a shaft that is further defined with a first end 137 and a second end 138. The arm motor 136 is an electric motor that is attached to the first end 137 of the magnet arm 133 such that the electric motor rotates the magnet arm 133. The lid magnet 132 is a commercially available electromagnet that is attached to the second end 138 of the magnet arm 133.

The magnetic field of the lid magnet 132 is controlled such that when electric current flows through the lid magnet 132 the lid magnet 132 is magnetically attractive and can be attached to the lid 163. When current does not flow through the lid magnet 132 the lid magnet 132 is, other than some negligible residual magnetic effects, magnetically inactive. Current flow through the lid magnet 132 is controlled by the magnet actuator 134. The magnetic actuator 134 is a switch that controls electric current flow through the lid magnet 132. In its initial position, the lid magnet 132 is positioned such that the lid magnet 132 is proximal to a first selected end of the canned food 161. When the operation of the invention 100 is initiated, the magnet actuator 134 is initiated activating the lid magnet 132 attaching the lid magnet 132 to the lid 163. The canned food 161 is then cut open. Once the lid 163 is cut off the canned food 161, the arm motor 136 rotates the magnet arm 133 away from the canned food 161 such that the piston 124 can push the food out of the can through the feed port 113 and into the bowl 112. When the lid 163 is clear of the can, the magnet actuator 134 is turned off thus turning off the lid magnet 132 and releasing the lid 163. The lid 163 is dropped and falls out of the discharge port 115.

The scheduler 103 is a timing device that is used to initiate and control the operation of the invention 100. The scheduler 103 is designed such that the scheduler 103 will: 1) monitor the time; 2) receive and store one or more daily initiation times from the user; 3) on a daily basis and at the initiation times discussed in the previous item (2) the scheduler 103 will initiate and control the operation of the invention 100. The scheduler 103 only needs one initiation time to operate, however, the scheduler 103 is designed to receive and store at least two daily initiation times from the user. The construction of the scheduler 103 in the first potential embodiment of the disclosure is discussed elsewhere in this disclosure.

In the first potential embodiment of the disclosure, the plurality of can openers 121 further comprises a first can opener 141 and a second can opener 142.

In the first potential embodiment of the disclosure the container 111 is formed as a single unit from molded plastic. The serpentine storage channel 116 is formed as a single unit from molded plastic. Suitable plastics include, but are not limited to, polyethylene, polycarbonate, or polyvinylchloride. The components described in the mechanism 102 are readily and commercially available. In the first realization of the first potential embodiment of the disclosure, the mechanism 102 was formed by modifying two commercially available can openers with readily and commercially available hardware components. The scheduler 103 is a timing circuit. The scheduler 103 can be purchased commercially. Alternatively, methods to synthesize and assemble the timing and logic circuits required by the scheduler 103 are well known and documented in the electrical arts. In the first realization of the first potential embodiment of the disclosure, the scheduler 103 was a custom made Arduino based programmable device using commercially available shields.

The following definitions were used in this disclosure:

Solenoid: As used in this disclosure, a solenoid is a cylindrical coil of electrical wire that generates a magnetic field that can be used to mechanically move a shaft made of a magnetic core.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate a continuous electrical control signal and then, after a predetermined amount of time, to discontinue or remove the said electrical control signal. In common usage, a timing circuit is also referred to as timing circuitry.

Timing Device: As used in this disclosure, a timing device is an automatic mechanism for activating or deactivating a device at a specific time.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A device for use in animal husbandry comprising:
a housing, a mechanism, and a scheduler;
wherein the device for use in animal husbandry is designed for unattended operation;
wherein the device for use in animal husbandry is adapted for use with cans;
wherein the device for use in animal husbandry is further adapted for use with animals;
wherein the device for use in animal husbandry stores and opens canned food intended for consumption by animals;
wherein the device for use in animal husbandry further dispenses said canned food to make it available for consumption by an animal;
wherein the housing is a rigid casing that further comprises a container and a serpentine storage channel;
wherein the container is a hollow rigid structure;
wherein the container further comprises a bowl, a feed port, a can port, and a discharge port;
wherein the container is further defined with a first side, a second side, a third side, a fourth side, a fifth side, and a sixth side;
wherein the can port is an aperture formed in the second side;
wherein the can port is sized to receive the canned food;
wherein the discharge port is an aperture formed in the third side;
wherein the discharge port is sized to allow empty cans to be discharged from the device for use in animal husbandry
wherein the feed port is an aperture that is formed in the fourth side of the container;
wherein the bowl attaches to the container underneath the feed port;
wherein the serpentine storage channel is a gravity driven rack system;
wherein the serpentine storage channel serpentine storage channel stores the canned food;
wherein the serpentine storage channel is further defined with an intake end and a discharge end;
wherein the serpentine storage channel is inclined;
wherein the mechanism comprises a plurality of can openers, a first roller, a first roller motor, and a piston;
wherein the mechanism opens the canned food;
wherein the mechanism discharges the contents of the canned food through the feed port;
wherein the mechanism discharges the empty can through the discharge port.

2. The device for use in animal husbandry according to claim 1 wherein the mechanism is mounted on the serpentine storage channel at the discharge end.

3. The device for use in animal husbandry according to claim 2 wherein the first roller is a urethane covered roller with an associated driveshaft;
wherein the first roller motor is an electric motor that is attached to the driveshaft of the first roller.

4. The device for use in animal husbandry according to claim 3 wherein the piston is a solenoid.

5. The device for use in animal husbandry according to claim 4 wherein each of the plurality of can openers further comprises a cutting disk, a lid magnet, a magnet arm, a magnet actuator, a cutting motor, and an arm motor.

6. The device for use in animal husbandry according to claim 5 wherein the lid magnet, the magnet arm, the magnet actuator and the arm motor are assembled into a single unit.

7. The device for use in animal husbandry according to claim 6 wherein the magnet arm is a shaft that is further defined with a first end and a second end;
wherein the arm motor is an electric motor that is attached to the first end of the magnet arm such that the electric motor rotates the magnet arm;
wherein the lid magnet is an electromagnet;
wherein the magnetic actuator is a switch that controls electric current flow through the lid magnet.

8. The device for use in animal husbandry according to claim 7 wherein the scheduler is a timing device;
wherein the scheduler used to initiate and control the operation of the device for use in animal husbandry;
wherein the scheduler monitors the time;
wherein the scheduler receives and stores one or more daily initiation times from the user;
wherein the scheduler on a daily basis and at the one or more received and stored initiation times will initiate and control the operation of the device for use in animal husbandry.

9. The device for use in animal husbandry according to claim 8 wherein the plurality of can openers further comprises a first can opener and a second can opener.

\* \* \* \* \*